(12) United States Patent
Shah (10) Patent No.: US 12,088,616 B2
(45) Date of Patent: Sep. 10, 2024

(54) DEEP CYBER VULNERABILITY MITIGATION SYSTEM

(71) Applicant: University of South Florida, Tampa, FL (US)

(72) Inventor: Ankit Shah, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 313 days.

(21) Appl. No.: 17/521,549

(22) Filed: Nov. 8, 2021

(65) Prior Publication Data

US 2022/0150271 A1 May 12, 2022

Related U.S. Application Data

(60) Provisional application No. 63/110,824, filed on Nov. 6, 2020.

(51) Int. Cl.
| | |
|---|---|
| *G06F 21/57* | (2013.01) |
| *G06N 3/02* | (2006.01) |
| *H04L 9/40* | (2022.01) |
| *H04L 41/16* | (2022.01) |

(52) U.S. Cl.
CPC ........ *H04L 63/1433* (2013.01); *G06F 21/577* (2013.01); *G06N 3/02* (2013.01); *H04L 41/16* (2013.01)

(58) Field of Classification Search
CPC ... H04L 63/1433; H04L 41/16; G06F 21/577; G06N 3/02
See application file for complete search history.

(56) References Cited

U.S. PATENT DOCUMENTS

| 10,735,456 B2 | 8/2020 | Crabtree | |
|---|---|---|---|
| 2009/0077666 A1* | 3/2009 | Chen | G06Q 10/0631 726/25 |
| 2017/0126712 A1 | 5/2017 | Crabtree | |
| 2018/0351987 A1* | 12/2018 | Patel | G06F 21/577 |
| 2019/0311121 A1 | 10/2019 | Martin | |
| 2020/0159915 A1* | 5/2020 | Klonowski | G06F 21/54 |
| 2020/0210590 A1* | 7/2020 | Doyle | G06F 8/77 |
| 2021/0021636 A1* | 1/2021 | Sbandi | H04L 63/1466 |

(Continued)

OTHER PUBLICATIONS

Caminero, G., et al. (2019). Adversarial environment reinforcement learning algorithm for intrusion detection. Computer Networks, 159, 96-109.

(Continued)

*Primary Examiner* — Stephen T Gundry
(74) *Attorney, Agent, or Firm* — Quarles & Brady LLP (57) ABSTRACT

A method, system, or apparatus for mitigating computer and network security deficiencies is provided in which, the method, system, or apparatus scans computer system components for finding a vulnerability, generates a Vulnerability Priority Scoring System (VPSS) score for the vulnerability based on the vulnerability, develops a vulnerability mitigation policy based on a system state comprising the VPSS score, wherein the vulnerability mitigation policy provides a best action for mitigating the vulnerability selected among one or more trained possible actions by a deep neural network, and performs the vulnerability mitigation policy based on the best action. Other aspects, embodiments, and features are also claimed and described.

19 Claims, 6 Drawing Sheets

(56) References Cited

U.S. PATENT DOCUMENTS

| | | | | |
|---|---|---|---|---|
| 2021/0211450 | A1* | 7/2021 | Aleidan | H04L 63/1433 |
| 2021/0273968 | A1* | 9/2021 | Shaieb | H04L 63/1433 |
| 2022/0058266 | A1* | 2/2022 | Modi | G06N 20/00 |
| 2022/0083450 | A1* | 3/2022 | Geddes | G06F 21/57 |
| 2023/0028886 | A1* | 1/2023 | Zhang | G06N 20/10 |
| 2023/0319019 | A1* | 10/2023 | Crabtree | H04L 9/40 |
| | | | | 713/180 |
| 2023/0319096 | A1* | 10/2023 | Cruz | G06F 8/65 |
| | | | | 726/25 |
| 2023/0328094 | A1* | 10/2023 | Brown | H04L 63/1433 |
| | | | | 726/23 |
| 2023/0336581 | A1* | 10/2023 | Dunn | G06F 21/577 |
| 2023/0351027 | A1* | 11/2023 | Salji | G06F 16/953 |
| 2023/0351456 | A1* | 11/2023 | Hogg | H04L 63/1433 |
| 2023/0362141 | A1* | 11/2023 | Crabtree | H04L 63/0807 |
| 2023/0362142 | A1* | 11/2023 | Crabtree | H04L 9/3239 |
| 2023/0362200 | A1* | 11/2023 | Crabtree | G06F 16/2477 |
| 2023/0370490 | A1* | 11/2023 | Crabtree | H04L 63/1433 |
| 2023/0370491 | A1* | 11/2023 | Crabtree | G06N 3/098 |
| 2023/0379352 | A1* | 11/2023 | Kuppa | G06F 40/205 |
| 2023/0388278 | A1* | 11/2023 | Crabtree | H04L 63/0428 |

OTHER PUBLICATIONS

Liu, Q., et al. (2011). VRSS: A new system for rating and scoring vulnerabilities. Computer Communications, 34(3), 264-273.

Sornsuwit, P., et al. (2019). A new hybrid machine learning for cybersecurity threat detection based on adaptive boosting. Applied Artificial Intelligence, 33(5), 462-482.

\* cited by examiner

DEEP CYBER VULNERABILITY MITIGATION SYSTEM

CROSS REFERENCE TO RELATED APPLICATION

This application claims the benefit of U.S. Provisional Patent Application Ser. No. 63/110,824, filed Nov. 6, 2020, the disclosure of which is hereby incorporated by reference in its entirety, including all figures, tables, and drawings.

TECHNICAL FIELD

The technology discussed below relates generally to computer and network systems, and more particularly, to techniques for mitigating security deficiencies in computer and network systems.

BACKGROUND

Malicious actors actively seek to exploit any weaknesses that may exist in the computational logic of software and hardware components in an organization's network. These weaknesses (vulnerabilities), when identified by the organizations, are reported in the National Vulnerability Database (NVD) maintained by the Department of Homeland Security's National Cyber Security Division. The number of new vulnerabilities reported in the NVD has increased significantly in the last few years such that the number is now more than two times of what they were in 2016. However, the technology and the availability of highly trained security personnel resources needed to mitigate the growing vulnerabilities have lagged behind. This has resulted in an asymmetric advantage for these malicious actors.

The technology and security personnel resources currently available in organizations to mitigate the vulnerabilities merely refer to the National Vulnerability Database (NVD). The levels of expertise also vary greatly among security personnel classified as junior, intermediate, and senior analysts. They also have varying skill sets associated with different computer and network devices. For instance, some analysts are more proficient in securing web server infrastructure compared to mobile user environment. Some analysts are more proficient with Microsoft systems compared to Unix-based systems. The current available technology is inadequate to mitigate vulnerabilities in an organization level. As a result, systems routinely remain unpatched making them vulnerable to security breaches from the adversaries. The potential consequences of an exploited vulnerability depend upon the context as well as the severity and persistence of the vulnerability, which may differ among networks and organizations. Furthermore, the security personnel tend to have varying levels of expertise and technical proficiencies associated with different computer and network devices.

The above approach can create three issues. 1) Vulnerability instances with a lower severity continue to persist in the network for a long time and may result in serious consequences. 2) A Common Vulnerability Scoring System (CVSS) in the NVD base score does not reflect the true severity of a vulnerability, as it does not consider organization-specific factors such as the relevance of the segment (location) of the network where the vulnerability is reported, the existing level of protection in that respective segment of the network, the presence of high-value assets in that segment, and the persistence (length of time) of the vulnerability in the network. The potential consequences stemming from an exploited vulnerability with a given CVSS value may differ from one network to another and also from one organization to another. 3) The suboptimal approach to the allocation of security personnel without considering their expertise and skills for vulnerability mitigation may directly impact the security posture of an organization. Due to the illustrated security vulnerabilities of an organization, there is a critical need to improve the security posture of the organization by optimizing the vulnerability mitigation process.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example a method, apparatus, or system for mitigating computer and network security deficiencies is disclosed. The method includes scanning computer system components for finding a vulnerability, generating a Vulnerability Priority Scoring System (VPSS) score for the vulnerability based on the vulnerability, developing a vulnerability mitigation policy based on a system state comprising the VPSS score, wherein the vulnerability mitigation policy provides a best action for mitigating the vulnerability selected among one or more trained possible actions by a deep neural network, and performing the vulnerability mitigation policy based on the best action.

The method, apparatus, or system described above fills the gap in research needed to develop resource-constrained approaches for effectively identifying and mitigating important organization-specific security vulnerabilities. The method, apparatus, or system develops a decision-support tool for effective cyber vulnerability triage and mitigation. In the face of ever-increasing cyber threats, an organization may 1) quantify context-based vulnerability exposure, and 2) optimize vulnerability triage and mitigation, subject to resource constraints.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
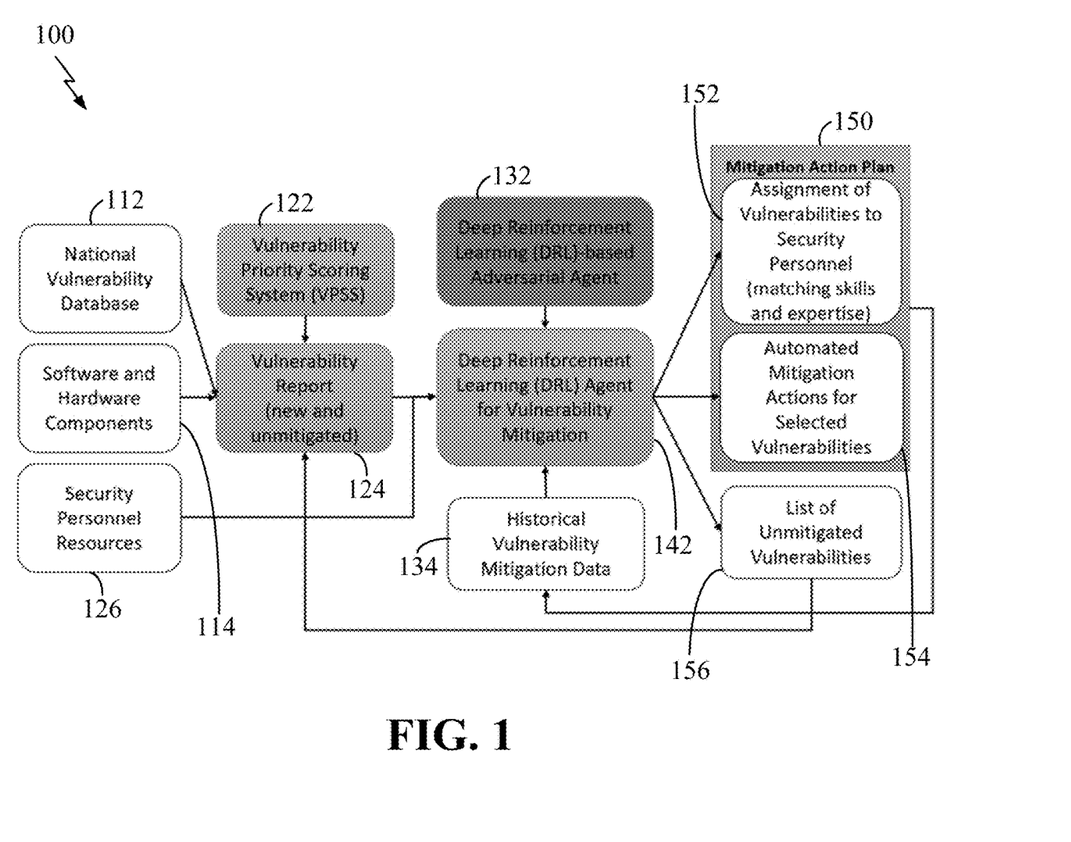
FIG. 1 is a schematic illustration of an exemplary vulnerable mitigation system according to some aspects of the disclosure.

FIG. 1 is a schematic illustration of an exemplary vulnerability mitigation system 100. The schematic illustration also indicates data flows in the vulnerability mitigation system 100. The vulnerable mitigation system 100 can optimize the vulnerability triage and mitigation process, which can be achieved by adding organization-specific context information to prioritize the mitigation of such relevant vulnerability instances and identifying optimal mitigation actions 150 and assigning them to appropriate security analysts 152.

The National Vulnerability Database (NVD) 112 is maintained by the Department of Homeland Security's National Cyber Security Division. The NVD contains a list of system weaknesses or vulnerabilities. Often, the weakness or vulnerability can be found in the computational logic (e.g., code) found in software and hardware components. The vulnerability may result, when exploited, in a negative impact to confidentiality, integrity, or availability. The list of vulnerabilities in the NVD may enable automation of vulnerability management, security measurement, and compliance.

The vulnerability mitigation system 100 can scan the software and hardware components 114 of an organization's network to find vulnerabilities that are reported in the NVD. The system 100 may can periodically scan the software and hardware components. Also, the system 100 may can non-periodically scan the software and hardware components when a new vulnerability report is obtained on demand when uncertainty (any of the uncertain conditions) unfolds. Based on the list of system vulnerabilities from the NVD 112 and the software and hardware component 114 scanning, the system may generate a vulnerability scan report. The system may import the vulnerability scan report outside of the system 100. The report may contain information about the identified vulnerability instances (VIs) such as the common vulnerability exposure (CVE) code, host name, description, and the Common Vulnerability Scoring System (CVSS) value indicating the severity rating, among others. The type of vulnerability is based on the operating system of the host. For instance, vulnerability on a Linux machine in a specialized sub-domain will be identified as "Type 1."

Based on the vulnerability scan report, the vulnerability priority scoring system (VPSS) 122 generates a VPSS score for each VI. The VPSS 122 may generate the VPSS score for each VI based on the following factors: a) the relevance of the network segment (location) where the vulnerability is reported, b) the level of existing protection in the reported segment, c) the presence of high-value assets in the segment, d) the persistence of the vulnerability in the network, and e) the common vulnerability scoring system (CVSS) value indicating the severity level of the VI. In order to obtain the VPSS score, qualitative responses to each of the above factors (such as high, medium, or low), obtained from the security analysts. Then, these responses are transformed to numerical values (normalized between 0 and 1)—i.e., assign a value of 1 to high and 0.25 to low, medium to be set at 0.5. Each vulnerability instance, j, is then assigned a VPSS score, $v_j = \Sigma_i w_i * u_{ij}$, where $w_i$ is the weight assigned to factor i and $u_{ij}$ represents the value that is assigned to factor i of vulnerability instance j. Thus, each VI has a VPSS score which is a sum of the scores of the factors. The sum of the VIs indicates vulnerability exposure score of an organization. VPSS scores for VIs may be separately stored in a memory. Alternatively, the VPSS score may be added to the vulnerability scan report. For example, the vulnerability report may have a table. In the table, each row may indicate a VI, and each column has information about the VI. VPSS scores for Vis may have an additional column in the vulnerability scan report.

A weight, $w_i$, is assigned to each of the factors (indexed by i), which denote the preference for each ($\Sigma_i w_i = 1$). These weights are entered by the stakeholders at the organization to initialize the VPSS model or can also be learned via the actual mitigation actions historically taken by the security personnel. These initial weights are then calibrated based on the feedback received on the mitigation plan developed for the organization by the defender. The security personnel may determine whether the selected vulnerability is important or appropriate. If the vulnerability is not important or the vulnerability assignment is not appropriate, as a feedback, data sample's estimation loss is passed through neural networks. The samples may help calibrate the weights associated with the factors.

VPSS scores are developed for all the vulnerabilities identified in the vulnerability scan report 124. The first three factors (relevance, level of protection, and the presence of high-value assets in the vicinity) are given qualitative responses (high, medium, or low) by the stakeholders, which are then transformed into numerical values (between 0 and 1). For instance, a high rating for the relevance (say, factor i) of a vulnerability instance j will be given a value of $u_{ij}=1$, whereas a low (medium) rating will assign $u_{ij}$ to 0.25 (0.5). These numbers can be obtained through discussions with the stakeholders. Similarly, the values of the other two factors are normalized by taking into consideration the largest value each factor can take (for example, 12 months for persistence and 10 for CVSS score) with the minimum value being 0. Once the numerical responses for all factors are obtained, the following formula can be used to normalize all values:

$$x_{normalized} = \frac{x - x_{minimum}}{x_{maximum} - x_{minimum}}.$$

Each vulnerability instance, j, is then assigned a VPSS score, $v_j=\Sigma_i w_i * u_{ij}$. The vulnerability exposure score of an organization is defined as $c=\Sigma_j v_j$, for all j unmitigated vulnerabilities.

In some examples, the vulnerability scan reports can be very dense for large organizations. Hence, to make this scoring mechanism scalable and implementable, an advanced analytics approach by using a supervised machine learning model to estimate the VPSS scores can be used. For example, in the machine learning-based VPSS scoring process, first, the security team in an organization assists in the priority scoring of the vulnerability instances by identifying the preferences (weights) for the factors and assigning numerical values to the qualitative responses, with their organizational knowledge and expertise. Next, this subset of vulnerabilities is used as a training data set to build and train a machine learning model. The VPSS scores in this training data set are considered to be the ground truth response values, and the mean squared error (MSE) is used as a performance metric to train various types of models (such as linear, tree-based, and nonlinear). The model with the lowest MSE value obtained using the training samples is then chosen as the machine learning model to be used in the vulnerability mitigation system 100. In some instances, next, a deep reinforcement learning (DRL) agent may use the machine learning-based VPSS scoring 122 and the vulnerability scan reports 124 to obtain optimal vulnerability mitigation actions.

A deep reinforcement learning (DRL)-based intelligent agent (defender) 142 considers the vulnerability scan reports 124, VPSS mechanism 122, and feedback from security personnel (human-in-the-loop) 126. The defender 142 may provide optimal vulnerability mitigation actions and assign them to either an automated agent 154 or to security analysts 152 based on their skills and expertise. A deep reinforcement learning (DRL)-based adversary 132 may indirectly affect the defender 142 such that the adversary 132 updates VPSS scores of the vulnerabilities. A list of unmitigated vulnerabilities which are not selected by the defender 142 may be used for adjusting VPSS scores.

In further examples, the VPSS scores of vulnerability mitigation system 100 may be utilized in systems that provide various risk management services. For example, an independent third party provider may access a company's system to perform a vulnerability assessment and return a score (and/or additional information) or a recommended set of prioritized mitigation efforts to the buyer or to the seller, prior to a merger/acquisition. In other embodiments, the report resulting from a vulnerability assessment could be utilized to determine premiums for a cyber insurance policy. In some embodiments, the insurer may be prevented from knowing specifics of a customer's systems/networks, but will merely receive a score or list of priority mitigation efforts. As a VPSS score of an organization takes into account organization-specific context-based information for determine the vulnerability priority scores, the VPSS score may indicate the organization's cyber vulnerability exposure. In some scenarios, an insurance policy may be assessed based on the VPSS score. For instance, if the VPSS score is low, the insurance premium is high because the VPSS score indicates that the organization's cyber security system is highly vulnerable. On the other hand, if the VPSS score is high, the insurance premium is low because the high VPSS score may indicate that the organization's cyber security system is robust. In even further examples, a cyber insurance policy may consider mitigation action plans 150 of the vulnerability mitigation system 100. For example, the insurance policy may determine the insurance premium based on the organization's action or agreement to execute one or more mitigation action plans of the vulnerability mitigation system 100. This is a mere example to exploit the vulnerability mitigation system 100. Any other suitable implementation can use the vulnerability mitigation system 100. In yet further embodiments, a provider could offer a certification that a customer, such as e-commerce vendors, has ameliorated all of the highest priority system vulnerabilities. Or, the certification could be updated on a regular basis (weekly, daily, monthly or in real time) to continually update a company's risk score via public certification.

Figure 2:
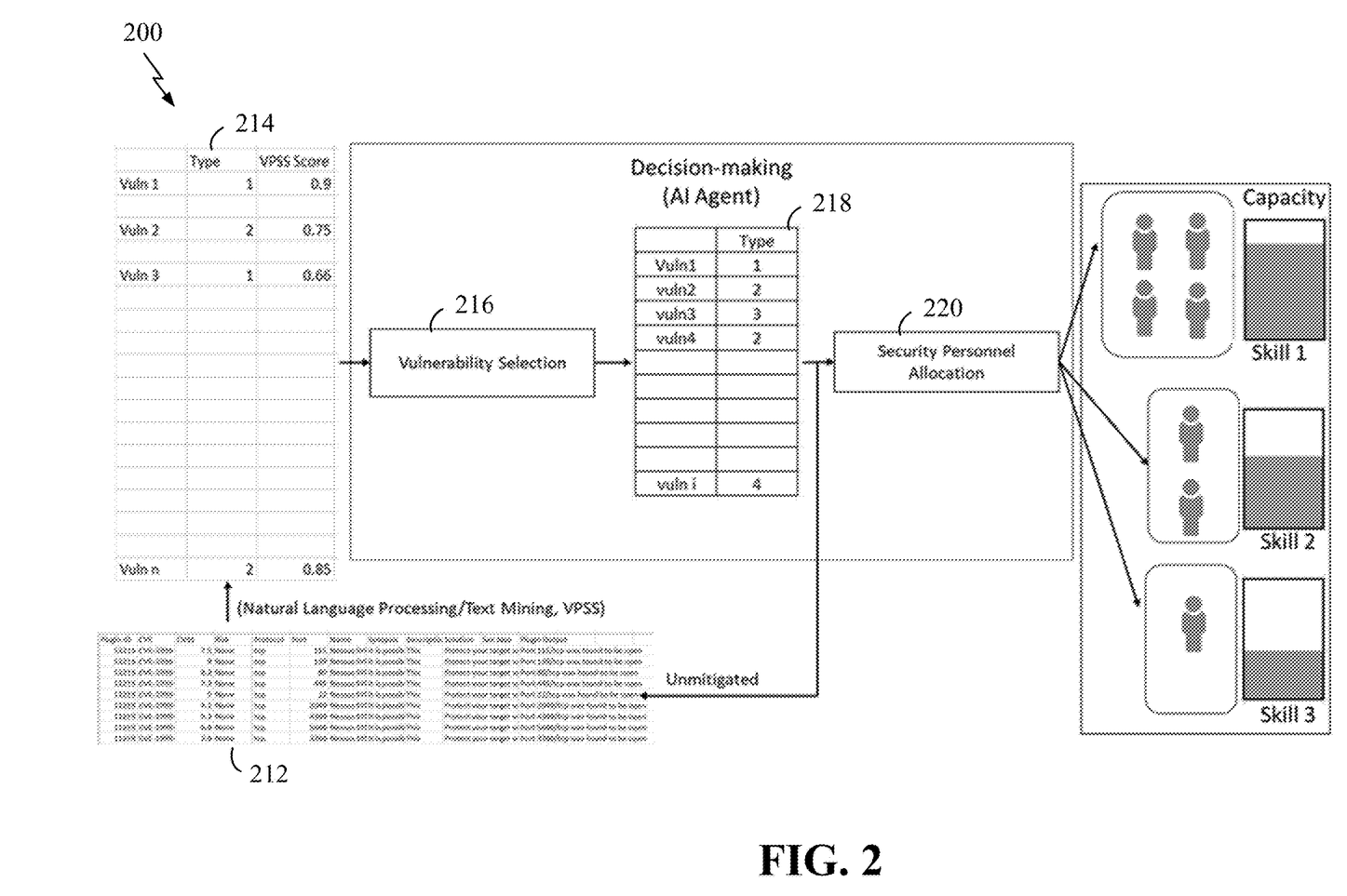
FIG. 2 is a schematic illustration to an exemplary vulnerability mitigation system according to some aspects of the disclosure.

FIG. 2 shows a schematic illustration to show how data moves in an exemplary vulnerability mitigation system 200. The system 200 may generate a vulnerability scan report 212 based on the list of system vulnerabilities from the NVD 112 and the software and hardware component 114 scanning. The system 200 may import the vulnerability scan report 212 from a proprietary vulnerability scanner based on the list of system vulnerabilities from the NVD 112 and the software and hardware component 114 scanning. The system 200 may derive and identify the factors from the vulnerability scanned report 212 by analyze the IP address/host name and other information in the report 212. Then, the system 200 may calculate a VPSS score 214 of each VI based on the identified factors with their assigned weights. Then, the system 200 may select a VI to mitigate 216. Based on its VPSS score 214 and security personnel information and adversary, the defender or AI agent 218 may produce an optimal policy to mitigate the vulnerability of the VI. The security personnel information may include each personnel's availability e.g., in terms of number of personnel-hours. Types of vulnerabilities may historically be mitigated by each personnel and recorded. The type may be an attribute of vulnerability host. For example, if a security personnel is specialized for a sub-domain and an expert on Linux, then identified as "Type 1." The optimal policy may be comprised of optimal actions to mitigate the VIs. The optimal policy may be assigned to security personnel matching skills and expertise 220. The optimal policy may be automatic actions like disconnecting devices, services from the network, upgrading of the software, disabling/disconnecting the service, applying a vendor-supplied patch, and adding an IP filter, among others. However, the automatic actions may be any other preselected actions. Any vulnerabilities that were not mitigated updates the vulnerability scanned report 212 by adding the unmitigated vulnerabilities in the report 212.

Figure 3:
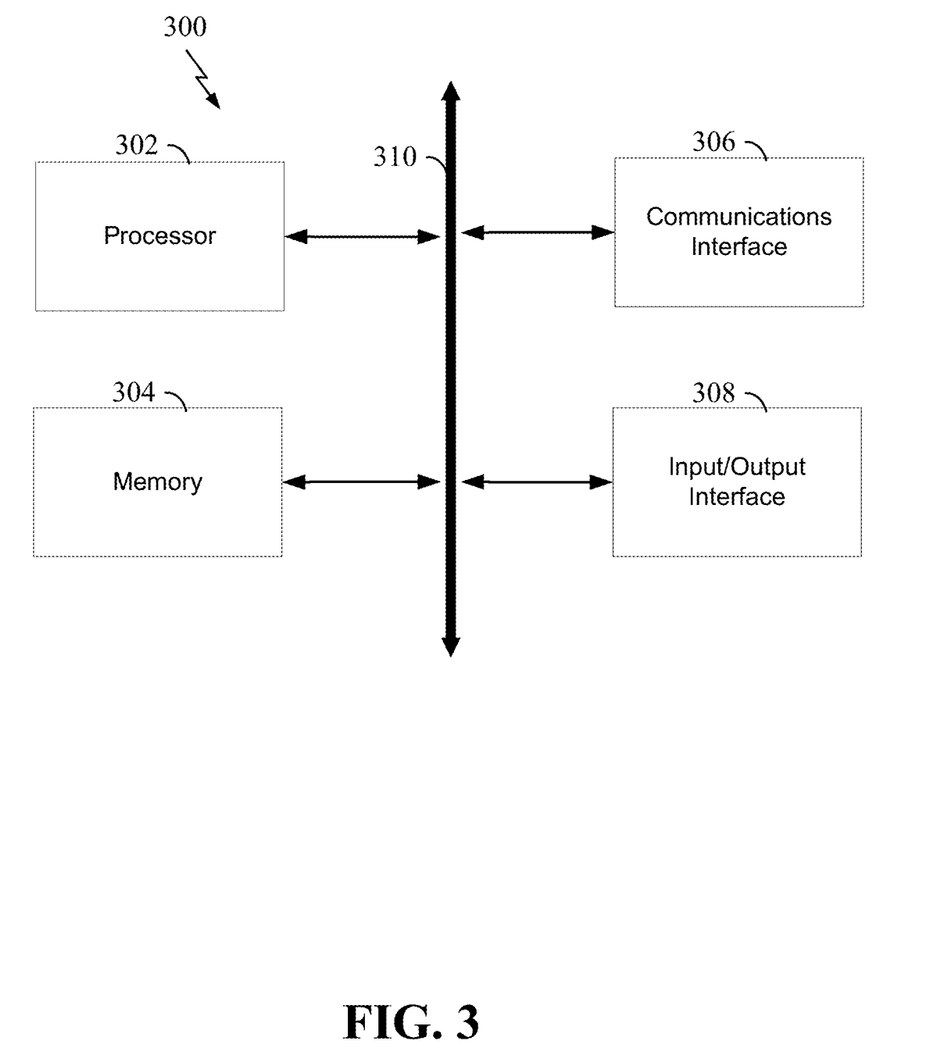
FIG. 3 is a block diagram conceptually illustrating an example of a hardware implementation for a vulnerable mitigation system according to some aspect of the disclosure.

FIG. 3 is a block diagram conceptually illustrating an example of a hardware implementation for a vulnerable mitigation system 300. The vulnerable mitigation system 300 includes a processor 302, a memory 304, a communications interface 306, and an input/output interface 308. Some or all of these components may communicate over a bus 310. Although bus 310 is illustrated here as a single bus, it may instead be implemented as one or more busses, bridges, or other communication paths used to interconnect components of the system 300. Memory 304 may be a non-transitory computer readable storage medium (e.g., read-only memory (ROM), random access memory (RAM), flash memory, etc.). Communication interface 306 may communicate with National Vulnerability Database. Input/output interface may receive and transmit data from a security personnel for vulnerability mitigation. Processor 302 may execute instructions stored in memory 104 to scan computer system components, generate a vulnerability scan report, generate a Vulnerability Priority Scoring System (VPSS) score, develop an adversary for identifying a weakness in a vulnerability mitigation policy, develop the vulnerability mitigation policy for mitigating vulnerability, updating the vulnerability mitigation policy, and performing the mitigation action plan.

Figure 4:
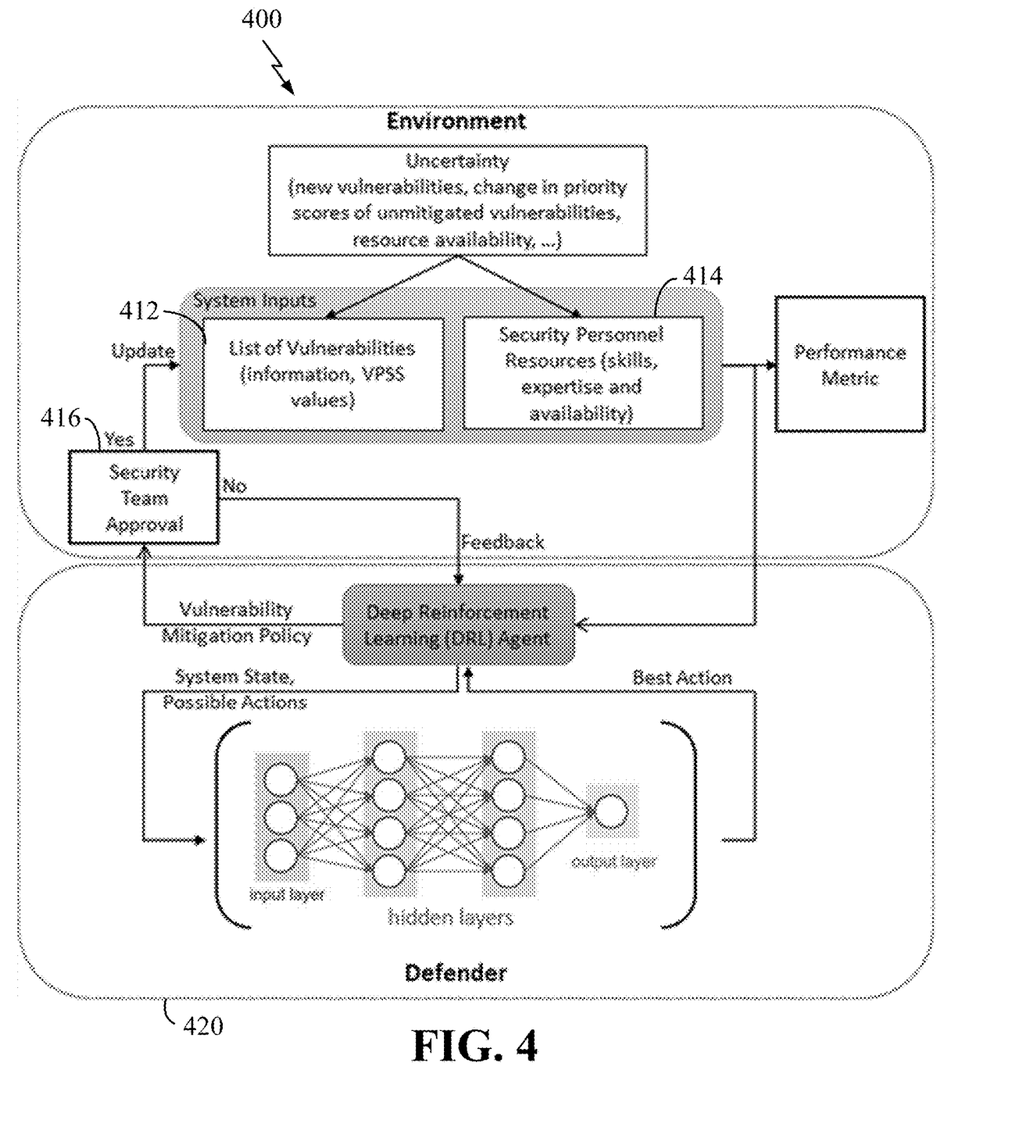
FIG. 4 is a schematic illustration of an exemplary defender in a vulnerable mitigation system according to some aspects of the disclosure.

FIG. 4 is a schematic illustration of an exemplary defender 410 in a vulnerable mitigation system 400. The defender 410 considers the vulnerability scan reports 412, VPSS mechanism 412, security personnel resources 414, and feedback from security personnel (human-in-the-loop) 416 to learn optimal vulnerability mitigation actions and assign them to either an automated agent or to security analysts 416 based on their skills and expertise. The defender 410 may keep the vulnerability exposure to a minimum over the long run given a resource-constrained environment. This is accomplished by developing a (near) optimal vulnerability mitigation policy for an organization that minimizes the cumulative VPSS scores of the unmitigated vulnerabilities. A VPSS score of an unmitigated VI may be cumulative. A policy is comprised of actions prescribed for the prioritized vulnerabilities that are targeted for mitigation based on available security personnel and other resources including preselected automated actions like disconnecting devices/services from the network. Optimization of a mitigation policy is accomplished through a sequential decision-making approach in which the mitigation actions are updated as the system condition (system state) evolves. A change in the system state is triggered by arrival of new vulnerabilities, change in priority scores of unmitigated vulnerabilities, and a change in availability and composition of the team of security personnel. The elements associated with the DRL formulation are as follows. Of course, the elements associated with the DRL formulation are not limited to the below-described elements. It could be any other element for the defender to produce a more optimal policy.

1) System state, $s_t$, contains the following information that is needed to make a decision at time t: 1) a list of vulnerabilities (new and previously unmitigated) and their respective attributes (VPSS values, host names, port numbers, descriptions, and so on); 2) security personnel information (skills, expertise, previous vulnerability mitigations, average time taken to mitigate vulnerabilities, and availability); 3) previously mitigated vulnerabilities and their mitigation methods; and 4) feedback in the form of vulnerability-security personnel pairings and vulnerability-mitigation method pairings from the previous mitigation policy that were not executed or approved by the organization (human-in-the-loop feedback). This feedback may be captured in a binary form, i.e., if the vulnerability instance and the security team member (or the mitigation method) pairing was not approved by the organization, the pair will be assigned a value of 0, else the value will be 1. This input is taken into consideration by the defender 420 for future assignments.

2) Action, $a_t$, represents how the system is controlled given a particular state $s_t$ at time t. The decision-making process considers many possible combinations of selected vulnerabilities and corresponding mitigation methods such as either patching the vulnerability or preventing its exploitability via limiting attackable surfaces. The defender also determines the appropriate security personnel to assign for mitigation of the vulnerability instances based on historical mitigation data.

3) Reward measures the impact of an action $a_t$ when taken in state $s_t$. It is measured by the changes in the vulnerability exposure score. The cumulative vulnerability exposure score is expressed as $C_t=\Sigma_t(\gamma^{t-t_0})c_t$, which includes the immediate vulnerability exposure score, $c_t$, and the accumulated exposure scores until the end of the horizon resulting from action $a_t$. The discount factor $\gamma$ takes a value between 0 and 1.

4) State transition function determines the probability of the system evolution from state $s_t$ to $s_{t+1}$ under action $a_t$. It is to be noted that the state transition probabilities are unknown and need to be estimated for a very large number of possible state transition combinations in the system.

The state space for the vulnerability mitigation decision-making problem may be large and include continuous variables. Also, there may be a large number of potential solutions to evaluate before choosing the best possible policy at each iteration. In a conventional reinforcement learning approach, the expected value of taking an action $a_t$ in state $s_t$ is calculated by following a policy Π. This action-value (or Q) function is denoted by $Q(s_t, a_t)=\min_\Pi [C_t|a_t, s_t, \Pi]$. To counter this curse of dimensionality, a nonlinear approximator in the form of a deep neural network is utilized to estimate the Q values for various state-action pairs at any given time t.

As shown in FIG. 4, as soon as a vulnerability scan report is obtained, the defender 420 may provide the best possible vulnerability mitigation policy. The best possible vulnerability mitigation policy may include a series of best actions for VIs. Each best action may pertain to a particular VI. The process of obtaining a vulnerability scan need not be periodic: i.e., a new vulnerability report could be obtained on demand when uncertainty (any of the uncertain conditions) unfolds. All the information available in the system input 412, 414 is provided to the defender 420 as a part of the state space, along with any previous feedback available from the security team 416 through human-in-the-loop design for mitigation action approvals. When the feedback is negative, the loss associated with this vulnerability mitigation action estimation can be calculated. Then, the calculated information can be used in the defender's neural networks to adjust the weights associated with the network. Through such samples, using human feedback, the future estimations and actions can be refined and fine-tuned. The state, $s_t$, is passed on as input to the deep neural network to obtain the estimates of the Q value for each possible action. The Q value approximator is denoted by $Q(s_t, a_t|\theta_t)$, where $\theta$ represents the neural network parameters. The approximator is trained using a loss function, $L(\theta_t)=E_{s_t}[(\hat{Q}(s_t, a_t|\theta_t)-Q(s_t, a_t|\theta_t))^2]$, where $\hat{Q}(s_t, a_t|\theta_t)=c_t+\gamma \min_{a_{t+1}} Q(s_{t+1}, a_{t+1}|\theta_t)$. The action pertaining to the lowest Q value is selected as the best action. When the mitigation policy selects and mitigates some of the vulnerabilities by performing a series of the best actions, those vulnerabilities are no longer present in the next iteration's input by updating the system inputs.

Figure 5:
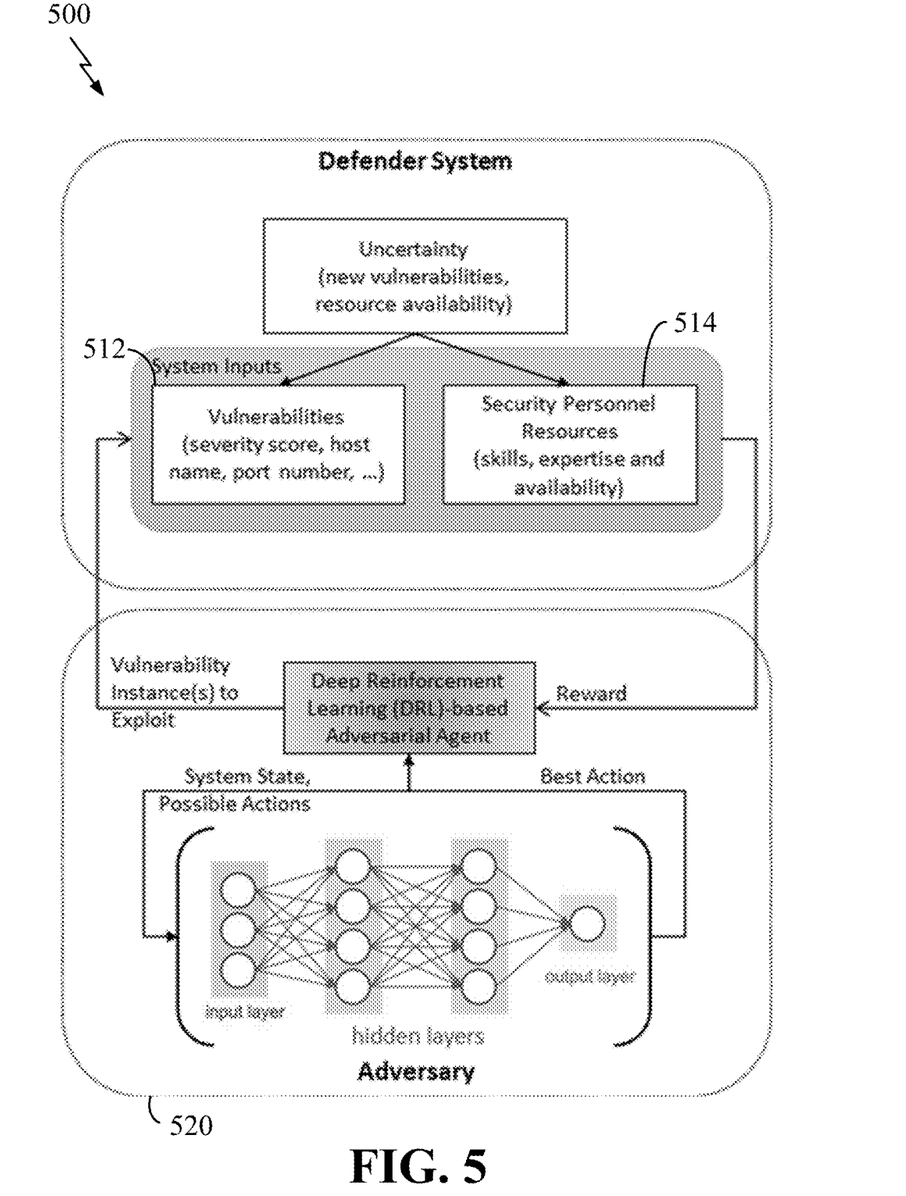
FIG. 5 is a schematic illustration of an exemplary adversary in a vulnerable mitigation system according to some aspects of the disclosure.

FIG. 5 is a schematic illustration of an exemplary adversary 520 in a vulnerable mitigation system 500. One feature of the adversary 520 of the vulnerable mitigation system 500 is to identify weaknesses in the defender's policies so that the defender can incorporate the findings and better protect its network by creating more robust policies against such strategic adversaries. Like the defender 420 who learns to take optimal actions for protecting high-value assets, the vulnerable mitigation system 500 may develop the adversary 520 who can also learn optimal actions to attain its target by continually interacting with the defender 420. The objective of the autonomous adversary 520 is to capture the maximum number of high-value assets in the defender's network, in the long run, by optimally selecting the vulnerability instances to exploit at any given time t. The adversary 520 is assumed to have complete knowledge of the defender 420 (the worst-case scenario for the defender 420). The optimization of this policy (the sequence of vulnerability instances selected for exploitation) is accomplished through a sequential decision-making approach, in which the problem is modeled as a Markov decision process. The elements of this formulation are as follows.

1) System state, $s_t$, contains the following information that is needed to make a decision at time t: a list of vulnerability instances found in the defender's network (new and previously unmitigated) and their respective attributes, security personnel information, and the location of high-value assets.

2) There are costs associated with the exploitation of various vulnerability instances and there is a budget constraint for the adversary at any given time stamp. The decision-making process of taking an action, $a_t$, given a state $s_t$ at time t, considers many possible combinations of vulnerability instances that could be selected for exploitation subject to the cost involved and the budget constraint.

The immediate reward, $r_t$, obtained after taking action, $a_t$, is measured as follows:

$$r_t = \begin{cases} -1, & \text{if the selected vulnerability instance is mitigated by the defender} \\ 1, & \text{if the selected vulnerability instance remain unmitigated} \\ x, & \text{if the high value asset is captured} \end{cases}$$

where x is a scalar reward. The cumulative reward obtained in the long run is represented as $R=\Sigma_t(\gamma^{t-t_0})r_t$, which includes the immediate reward, $r_t$, and the accumulated future rewards until the end of the horizon resulting from action $a_t$. The adversary's reward affect the system inputs 412. In particular, the reward may affect the factors for a VI's VPSS score.

A nonlinear approximator in the form of a deep neural network, like the defender's framework, is utilized to estimate the action-value (or Q) function for the adversary. Any harmful policies learned by the adversary 520 are then incorporated into the retraining of the defender, thereby making the defender's policies more robust. Thus, the adversary 520 relies on the same inputs as the defender 420 except the reward of the adversary 520. The adversary 520 makes a move as to which a VI the adversary 520 is to exploit. In the meantime, the defender 420 makes a move on which a VI the defender 420 select for mitigation. If the adversary's 520 VI selection for exploitation is patched by the defender 420, the VI is removed from the system input list as it is mitigated by the defender 420. In this case, the reward to the adversary 520 is −1. If the adversary 520 is able to exploit the vulnerability on the host, the VI is removed from the input list as it is already compromised and gets a reward of 1 or x (depending upon the high-value asset present on the host or not).

Figure 6:
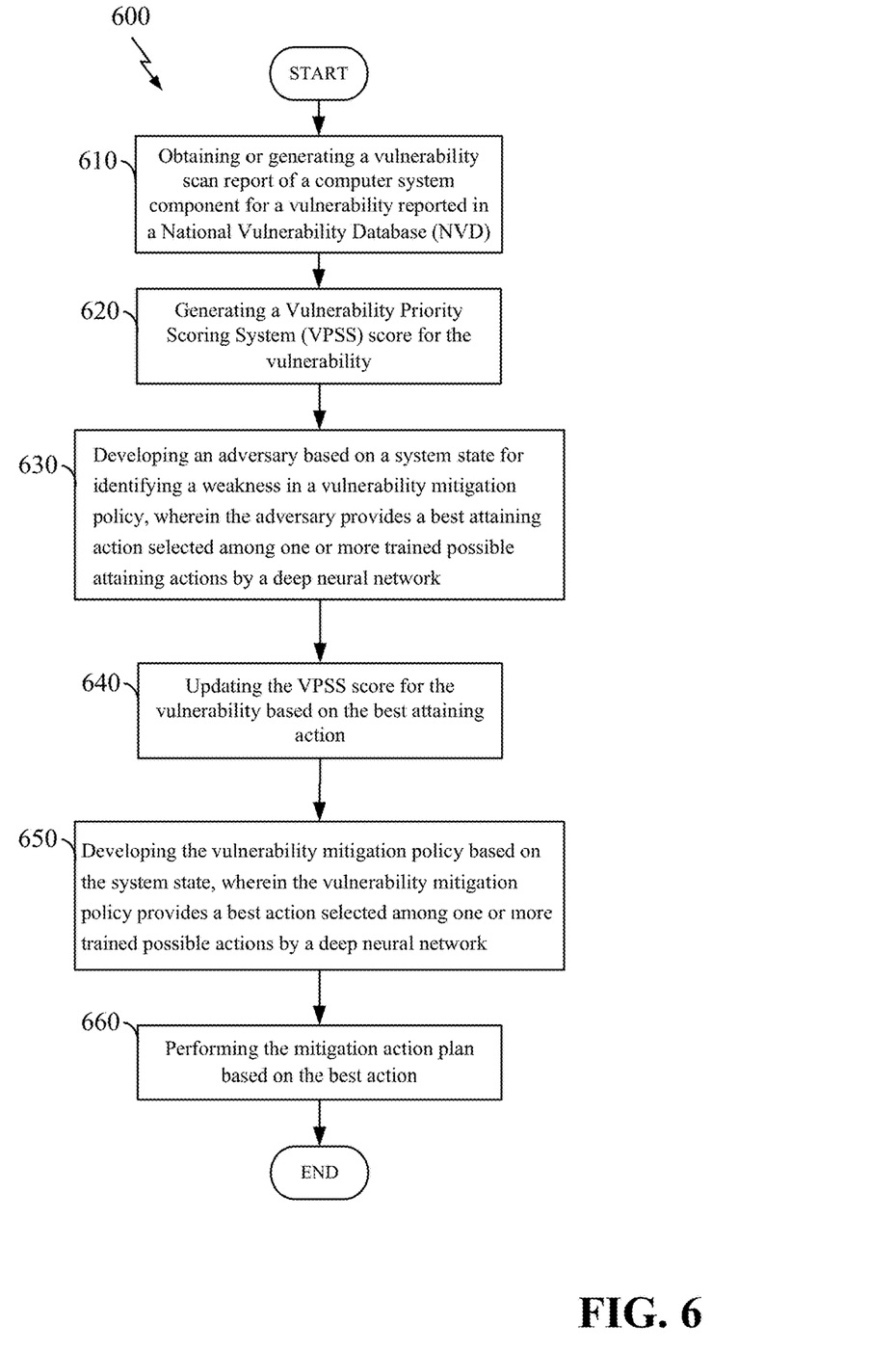
FIG. 6 is a flow chart illustrating an exemplary process for mitigating vulnerability according to some aspects of the disclosure.

FIG. 6 is a flow chart illustrating an exemplary process for mitigating vulnerability. This process may be implemented via software code stored on a local or virtual/cloud memory, and can be performed by one or more processors operating such code. In Step 610, the vulnerability mitigation system 600 may obtaining or generate a vulnerability scan report of a computer system component for a vulnerability reported in a National Vulnerability Database (NVD). The computer system component may include a software component and a hardware component. The system 600 may generate or obtain a vulnerability scan report based on the vulnerability.

In Step 620, the vulnerability mitigation system 600 may generate a VPSS score based on the vulnerability. The VPSS score may be generated based on at least one of factors: a relevance of a network segment in which the vulnerability is reported, a level of existing protection in the network segment, a number of high-value assets in the network segment, a length of time of the vulnerability residing in the network segment, or a level of severity of the vulnerability. A weight may be assigned to each of the factor, and the weight may be calibrated based on a feedback from the vulnerability mitigation plan.

In some examples, the vulnerability mitigation system 600 may generate a VPSS score using a machine learning-based VPSS. For example, the security team in an organization may use historical vulnerability data to score priority of the vulnerability instances. The security team identifies the preferences (weights) for the factors and assigns numerical values to the qualitative responses, with their organizational knowledge and expertise. In some instances, a National Vulnerability Database (NVD), software and hardware components of the organization, and/or security personnel resources can be used to generate a VPSS score. Then, this subset of vulnerabilities is used as a training data set to build and train a machine learning model. The VPSS scores based on the machine learning model can be used for a deep reinforcement learning (DRL) agent.

In Step 630, the vulnerability mitigation system 600 may develop an adversary based on a system state for identifying a weakness in a vulnerability mitigation policy. The adversary provides a best attaining action selected among one or more trained possible attaining actions by a deep neural network.

In Step 640, based on the best attaining action, the system may update the VPSS score. Thus, the adversary may indirectly affect the defender such that the adversary updates VPSS scores of the vulnerabilities. The system state may further include at least one of: a location of high-value assets, a security personnel resource information, previously mitigated vulnerability information, and a feedback information.

In Step 650, a defender of the vulnerability mitigation system 600 may develop the vulnerability mitigation policy based on the system state. The vulnerability mitigation policy provides a best action for mitigating the vulnerability selected among one or more trained possible actions by a deep neural network. In some examples, the defender considers the vulnerability scan reports, VPSS mechanism, and feedback from security personnel (human-in-the-loop). The defender may provide optimal vulnerability mitigation actions and assign them to either an automated agent or to security analysts based on their skills and expertise. A list of unmitigated vulnerabilities which are not selected by the defender may be used for adjusting VPSS scores.

In Step 660, the vulnerability mitigation system 600 may perform the vulnerability mitigation policy based on the best action. The best action may be a prescribed action for the vulnerability based on available security personnel or a preselected automated action. The performed vulnerability mitigation policy improves the functioning of a computer or a network by strengthening the cyber security of the organization and preventing ransomware attacks and security breaches from damaging a computer or the entire network of the organization. In addition, the vulnerability mitigation policy improves the cyber security technology by quantifying context-based vulnerability exposure, and optimizing vulnerability triage and mitigation, subject to resource constraints. That is, the current vulnerability mitigation system 600 uses less resources but be more effective to protect a network system or a computer than currently available cyber security systems.

Various networks and systems may also be utilized to implement and embody the methods discussed above. For example, the vulnerability mitigation system 600 may be presented as a separate, cloud-based software-as-a-service that is stored and operating on a remote server. In other instances, the vulnerability mitigation system 600 may be implemented within or as part of a local network, stored on a memory or drive within the network and operating via processing resources of the network. In other implementations, various parts of the system 600 may be local or remote; for example, the defender and adversary may be located in different networks or operated by different processing resources.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

One or more of the components, steps, features and/or functions illustrated in FIGS. 1-6 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-6 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for mitigating computer and network security deficiencies comprising:
   obtaining a vulnerability scan report for a vulnerability on a computer system component;
   generating a Vulnerability Priority Scoring System (VPSS) score for the vulnerability based on the vulnerability scan report, wherein the VPSS score is generated by summing a plurality of values based on a qualitative response associated with at least one of factors: a relevance of a network segment in which the vulnerability is reported, a level of existing protection in the network segment, a number of high-value assets in the network segment, or a length of time of the vulnerability residing in the network segment;
   developing a vulnerability mitigation policy based on a system state comprising the VPSS score, wherein the vulnerability mitigation policy provides a best action for mitigating the vulnerability selected among one or more trained possible actions by a deep reinforcement learning agent; and
   performing the vulnerability mitigation policy based on the best action.

2. The method of claim 1 further comprising:
   developing an adversary based on the system state for identifying a weakness in the vulnerability mitigation policy, wherein the adversary provides a best attaining action selected among one or more trained possible attaining actions by a deep reinforcement learning agent; and
   updating the VPSS score based on the best attaining action.

3. The method of claim 1, wherein the computer system component comprises a software component and a hardware component.

4. The method of claim 1, wherein the plurality of values is further based on an qualitative response associated with a level of severity of the vulnerability.

5. The method of claim 4, wherein the VPSS score is generated using a machine learning model,
   wherein the at least one of the factors is used as training data to build and train the machine learning model.

6. The method of claim 5, wherein the machine learning model has a lowest mean squared error (MSE) among a plurality of machine learning models obtained based on the training data.

7. The method of claim 4, wherein a weight is assigned to each of the at least one of factors, and the weight is calibrated based on a feedback from the vulnerability mitigation policy.

8. The method of claim 1, wherein the best action is at least one of: a prescribed action for the vulnerability based on available security personnel or a preselected automated action.

9. The method of claim 1, wherein the system state further comprises at least one of: a location of high-value assets, a security personnel resource information, previously mitigated vulnerability information, and a feedback information.

10. A method for mitigating computer and network security deficiencies comprising:
    generating a vulnerability scan report for a vulnerability on a computer system component;

generating a Vulnerability Priority Scoring System (VPSS) score for the vulnerability based on the vulnerability scan report;

developing a vulnerability mitigation policy based on a system state comprising the VPSS score, wherein the vulnerability mitigation policy provides a best action for mitigating the vulnerability selected among one or more trained possible actions by a deep reinforcement learning agent; and performing the vulnerability mitigation policy based on the best action;

developing an adversary, based on the system state, for identifying a weakness in the vulnerability mitigation policy, wherein the adversary provides a best attaining action selected among one or more trained possible attaining actions by the deep reinforcement learning agent; and updating, using a processor, the vulnerability mitigation policy when the system state changes.

11. The method of claim 10, wherein the step of generating a vulnerability scan report is based on a National Vulnerability Database (NVD).

12. The method of claim 10 further comprising:
updating the VPSS score based on the best attaining action.

13. The method of claim 10, wherein the computer system component comprise a software component and a hardware component.

14. The method of claim 10, wherein the VPSS score is generated based on at least one of factors: a relevance of a network segment in which the vulnerability is reported, a level of existing protection in the network segment, a number of high-value assets in the network segment, a length of time of the vulnerability residing in the network segment, or a level of severity of the vulnerability.

15. The method of claim 14, wherein the VPSS score is generated using a machine learning model,
wherein the at least one of the factors is used as training data to build and train the machine learning model.

16. The method of claim 15, wherein the machine learning model has a lowest mean squared error (MSE) among a plurality of machine learning models obtained based on the training data.

17. The method of claim 14, wherein a weight is assigned to each of the at least one of factors, and the weight is calibrated based on a feedback from the vulnerability mitigation policy.

18. The method of claim 10, wherein the best action is at least one of: a prescribed action for the vulnerability based on available security personnel or a preselected automated action.

19. The method of claim 10, wherein the system state further comprises at least one of: a location of high-value assets, a security personnel resource information, previously mitigated vulnerability information, and a feedback information.

* * * * *